US010229290B2

(12) United States Patent
Rahardjo et al.

(10) Patent No.: US 10,229,290 B2
(45) Date of Patent: Mar. 12, 2019

(54) KEYLESS METHOD TO SECURE PHYSICAL ACCESS TO INFORMATION HANDLING SYSTEMS IN A DATACENTER

(71) Applicant: Dell Products L.P., Round Rock, TX (US)

(72) Inventors: Johan Rahardjo, Austin, TX (US); Gobind Vijayakumar, Trichy (IN); Salvador D. Jimenez, III, Cedar Park, TX (US)

(73) Assignee: Dell Products L.P., Round Rock, TX (US)

( * ) Notice: Subject to any disclaimer, the term of this patent is extended or adjusted under 35 U.S.C. 154(b) by 217 days.

(21) Appl. No.: 15/139,910

(22) Filed: Apr. 27, 2016

(65) Prior Publication Data
US 2017/0316226 A1   Nov. 2, 2017

(51) Int. Cl.
*G06F 21/00* (2013.01)
*G06F 21/70* (2013.01)
*G06F 21/88* (2013.01)
*G06F 21/34* (2013.01)
*H04L 9/32* (2006.01)
*H04L 9/08* (2006.01)

(52) U.S. Cl.
CPC .............. *G06F 21/70* (2013.01); *G06F 21/34* (2013.01); *G06F 21/88* (2013.01); *H04L 9/0897* (2013.01); *H04L 9/3234* (2013.01); *H04L 9/3247* (2013.01)

(58) Field of Classification Search
CPC ........... G06F 21/70; G06F 21/00; G06F 21/88
See application file for complete search history.

(56) References Cited

U.S. PATENT DOCUMENTS

| | | | |
|---|---|---|---|
| 9,198,060 B2 | 1/2015 | Terwilliger et al. | |
| 2002/0040936 A1* | 4/2002 | Wentker | G06F 8/60 235/492 |
| 2014/0146459 A1* | 5/2014 | Hazzard | G06F 1/16 361/679.21 |
| 2015/0095631 A1 | 4/2015 | Rahardjo et al. | |
| 2015/0278552 A1* | 10/2015 | Chen | G06F 21/70 726/34 |
| 2016/0073276 A1 | 3/2016 | Terwilliger et al. | |
| 2016/0335438 A1* | 11/2016 | Dadu | G06F 21/70 |
| 2017/0288867 A1* | 10/2017 | Collier | H04L 9/0861 |

* cited by examiner

*Primary Examiner* — Christopher C Harris
(74) *Attorney, Agent, or Firm* — Baker Botts L.L.P.

(57) ABSTRACT

Systems and methods are disclosed for securing an information handling system. A method for securing an information handling system may include securing the information handling system in an enclosure with a locking mechanism of a bezel; receiving a request to unlock the bezel at a baseboard management controller (BMC), the BMC communicatively coupled to the bezel; retrieving a first artifact stored in a trusted platform module (TPM) in response to the request; attempting to authorize the request using the first artifact; and unlocking the locking mechanism if the request is authorized.

14 Claims, 3 Drawing Sheets

KEYLESS METHOD TO SECURE PHYSICAL ACCESS TO INFORMATION HANDLING SYSTEMS IN A DATACENTER

TECHNICAL FIELD

This disclosure relates generally to information handling systems and, more particularly, to a system and method for securing the information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

An information handling system may be a server, such as a rack or blade server, located in a datacenter. The information handling system may be placed in an enclosure. The enclosure, sometimes referred to as a mount, cabinet, frame, or rack, may provide power, cooling, and cable management to the information handling systems within the enclosure. To protect against equipment and data theft, datacenters may be located in secure facilities that limit access to authorized individuals. Such facilities may include closed circuit television systems, access control systems, guards, alarms, and other forms of security. To further protect against data and equipment theft, a locking bezel may be used to secure the information handling system within the enclosure so that the system cannot be physically accessed or removed from the enclosure without first removing the bezel with the bezel key. However, as data breaches become more prevalent and costly, additional security measures are desirable to protect against equipment and data theft in data centers.

SUMMARY

In accordance with some embodiments of the present disclosure an information handling system may include a bezel comprising a locking mechanism securing the information handling system in an enclosure. The information handling system may further include a baseboard management controller (BMC) communicatively coupled to the bezel. The BMC may be configured to receive a request to unlock the locking mechanism; retrieve a first artifact stored in a trusted platform module (TPM) in response to the request; attempt to authorize the request using the first artifact; and unlock the locking mechanism if the request is authorized.

In accordance other embodiments of the present disclosure, a method for securing an information handling system may include securing the information handling system in an enclosure with a locking mechanism of a bezel. The method may also include receiving a request to unlock the bezel at a baseboard management controller (BMC), the BMC communicatively coupled to the bezel. The method may further include retrieving a first artifact stored in a trusted platform module (TPM) in response to the request. In addition, the method may include attempting to authorize the request using the first artifact. The method may further include unlocking the locking mechanism if the request is authorized.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION

In the following description, details are set forth by way of example to facilitate discussion of the disclosed subject matter. It should be apparent to a person of ordinary skill in the field, however, that the disclosed embodiments are exemplary and not exhaustive of all possible embodiments.

As used herein, a hyphenated form of a reference numeral refers to a specific instance of an element and the un-hyphenated form of the reference numeral refers to the collective or generic element. Thus, for example, widget "72-1" refers to an instance of a widget class, which may be referred to collectively as widgets "72" and any one of which may be referred to generically as a widget "72."

As noted previously, one or more information handling systems may be placed in an enclosure, such as a mount, cabinet, frame, or rack. The enclosure may provide power, cooling, and/or cable management to the information handling systems located within the enclosure. The information handling system may be secured in the enclosure by a bezel, such that removal of and/or physical access to the information handling system first requires removal of the bezel. The bezel may include a bezel controller and a locking mechanism to unlock the bezel in response to an authorized request, thereby controlling physical access to the information handling system to authorized individuals.

In some embodiments, the bezel may comprise a bezel controller capable of locking and unlocking the locking mechanism upon receipt of an authorized request for access to the information handling system. By default, the locking mechanism may remain locked, securing the information handling system in the enclosure. When access to the information handling system is desired, a user (e.g., system administrator) may submit a request that the bezel unlock. Such a request may be made remotely through a network communication or locally through the bezel securing the information handling system in the enclosure. The information handling system may process the request by checking certain security criteria to determine whether the request is authorized. If the request is authorized, the bezel controller may unlock the locking mechanism of the bezel, allowing access and removal of the information handling system. If, however, the request is not authorized, the information handling system may deny the request, such that the locking mechanism of the bezel remains in a locked position, securing the information handling system from access or removal from the enclosure.

For the purposes of this disclosure, an information handling system may include an instrumentality or aggregate of instrumentalities operable to compute, classify, process, transmit, receive, retrieve, originate, switch, store, display, manifest, detect, record, reproduce, handle, or utilize various forms of information, intelligence, or data for business, scientific, control, entertainment, or other purposes. For example, an information handling system may be a server, a personal computer, a PDA, a consumer electronic device, a network storage device, or another suitable device and may vary in size, shape, performance, functionality, and price. The information handling system may include memory, one or more processing resources such as a central processing unit (CPU) or hardware or software control logic. Additional components of the information handling system may include one or more storage devices, one or more communications ports for communicating with external devices as well as various input and output (I/O) devices, such as a keyboard, a mouse, and a video display. The information handling system may also include one or more buses operable to transmit communication between the various hardware components.

Particular embodiments are best understood by reference to FIGS. 1-4 wherein like numbers are used to indicate like and corresponding parts.

Figure 1:
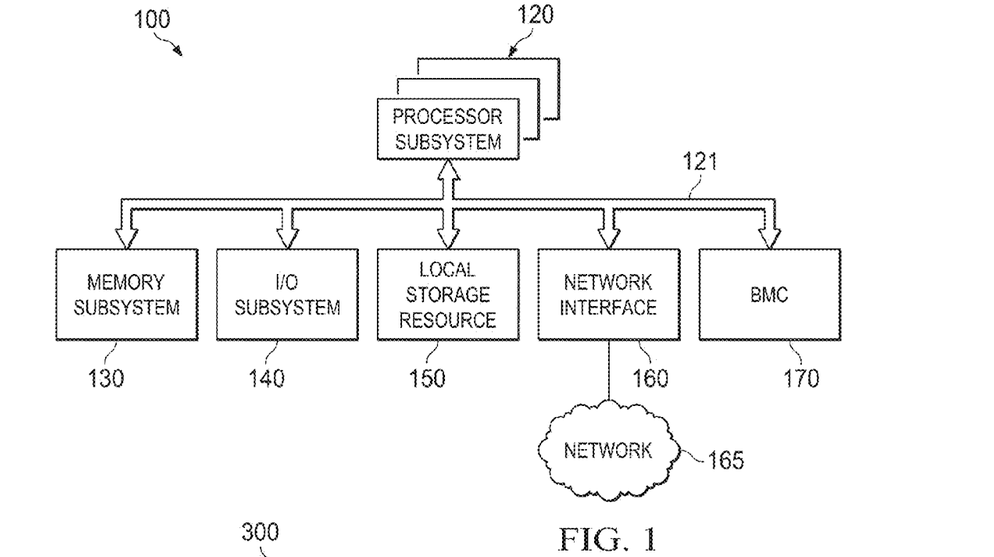
FIG. 1 illustrates a block diagram of selected elements of an embodiment of an information handling system.

FIG. 1 illustrates a block diagram of selected elements of an embodiment of an information handling system 100 in accordance with some embodiments of the present disclosure. In various embodiments, information handling system 100 may represent different types of information handling systems in an enterprise computing environment, such as a blade server, rack server, or another type of clustered computing resource. In some embodiments, information handling system 100 may be placed in an enclosure (not shown) that houses one or more other information handling systems.

Components of information handling system 100 may include, but are not limited to, processor subsystem 120, which may comprise one or more processors, and system bus 121 that communicatively couples various system components to processor subsystem 120 including, for example, memory subsystem 130, I/O subsystem 140, local storage resource 150, network interface 160, and baseboard management controller (BMC) 170. External or remote elements, such as network 165, are also shown to give context to an environment in which information handling system 100 may be configured to operate.

Processor subsystem 120 may comprise a system, device, or apparatus operable to interpret and/or execute program instructions and/or process data, and may include a microprocessor, microcontroller, digital signal processor (DSP), application specific integrated circuit (ASIC), or another digital or analog circuitry configured to interpret and/or execute program instructions and/or process data. In some embodiments, processor subsystem 120 may interpret and/or execute program instructions and/or process data stored locally (e.g., in memory subsystem 130). In the same or alternative embodiments, processor subsystem 120 may interpret and/or execute program instructions and/or process data stored remotely (e.g., in a network storage resource, not shown).

System bus 121 may represent a variety of suitable types of bus structures, including for example, a memory bus, a peripheral bus, or a local bus using various bus architectures in selected embodiments. For example, such architectures may include, but are not limited to, Micro Channel Architecture (MCA) bus, Industry Standard Architecture (ISA) bus, Enhanced ISA (EISA) bus, PCI bus, PCI-E bus, HyperTransport (HT) bus, Integrated Interchip Sound (IIS) bus, Serial Peripheral Interface (SPI) bus, Inter-Integrated Circuit (IIC or $I^2C$), and Video Electronics Standards Association (VESA) local bus, among others. Although illustrated as a single bus in FIG. 1, system bus 121 may be implemented as a combination of one or more suitable busses, and in some embodiments, various components may use one or more different busses to communicate with other components of information handling system 100.

Memory subsystem 130 may comprise a system, device, or apparatus operable to retain and/or retrieve program instructions and/or data for a period of time (e.g., computer-readable media). Memory subsystem 130 may comprise random access memory (RAM), electrically erasable programmable read-only memory (EEPROM), a PCMCIA card, flash memory, magnetic storage, opto-magnetic storage, and/or a suitable selection and/or array of volatile or non-volatile memory that retains data after power to its associated information handling system, such as information handling system 100, is powered down.

In information handling system 100, I/O subsystem 140 may comprise a system, device, or apparatus generally operable to receive and/or transmit data to/from/within information handling system 100. I/O subsystem 140 may represent, for example, a variety of communication interfaces, graphics interfaces, video interfaces, user input interfaces, and/or peripheral interfaces. For example, I/O subsystem 140 may comprise a touch panel and display adapter. The touch panel (not shown) may include circuitry for enabling touch functionality in conjunction with a display (not shown) that is driven by display adapter (not shown).

Local storage resource 150 may comprise computer-readable media (e.g., hard disk drive, floppy disk drive, CD-ROM, and/or other type of rotating storage media, flash memory, EEPROM, and/or another type of solid state storage media) and may be generally operable to store instructions and/or data. For example, local storage resource 150 may store executable code in the form of program files that may be loaded into memory 130 for execution. In addition to local storage resources 150, in some embodiments, information handling system 100 may communicatively couple via network 165 to a network storage resource (not shown) using network interface 160 discussed below.

Network interface 160 may be a suitable system, apparatus, or device operable to serve as an interface between information handling system 100 and network 165. Network interface 160 may enable information handling system 100 to communicate over network 165 using any suitable transmission protocol and/or standard, including but not limited to various transmission protocols and/or standards. Network 165 coupled to network interface 160 may be implemented as, or may be a part of, a storage area network (SAN), personal area network (PAN), local area network (LAN), a metropolitan area network (MAN), a wide area network (WAN), a wireless local area network (WLAN), a virtual private network (VPN), an intranet, the Internet or another appropriate architecture or system that facilitates the communication of signals, data and/or messages (generally referred to as data or information). In some embodiments, network 165 communicatively coupled to network interface 160 may transmit data using a desired storage and/or communication protocol, including, but not limited to, Fibre Channel, Frame Relay, Asynchronous Transfer Mode (ATM), Internet protocol (IP), other packet-based protocol, small computer system interface (SCSI), Internet SCSI (iSCSI), Serial Attached SCSI (SAS) or another transport that operates with the SCSI protocol, advanced technology attachment (ATA), serial ATA (SATA), advanced technology attachment packet interface (ATAPI), serial storage architecture (SSA), integrated drive electronics (IDE), and/or any combination thereof. Network 165, network interface 160, and/or various components associated therewith may be implemented using hardware, software, or any combination thereof. Network interface 160 may enable wired and/or wireless communications to and/or from information handling system 100.

In some embodiments, information handling system 100 may also include BMC 170. BMC 170 may include any system, device, or apparatus configured to allow system administrators to manage and/or monitor the operation of information handling system 100. BMC 170 may communicably couple to one or more sensors (not illustrated) and other components of information handling system 100, such that BMC 170 may monitor the operation of information handling system 100, configure software and hardware associated with information handling system 100, and/or recover information handling system 100 to ensure data integrity. Aspects of BMC 170 are discussed in more detail below with respect to FIG. 2.

Figure 2:
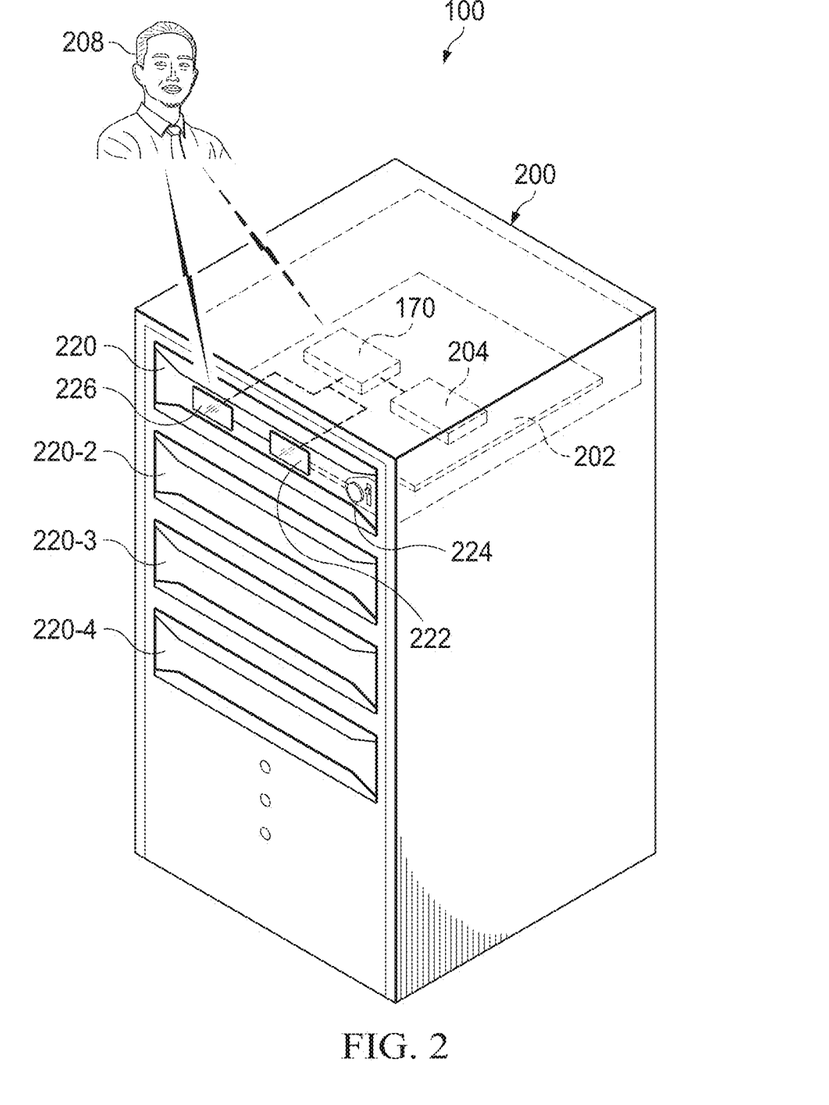
FIG. 2 illustrates an isometric view of an enclosure securing an information handling system in accordance with some embodiments the present disclosure.

FIG. 2 illustrates an isometric view of an enclosure securing an information handling system in accordance with certain embodiments of the present disclosure. Information handling system 100 may be placed in enclosure 200, by for example, sliding the system into the slot of of enclosure 200. To secure information handling system 100, bezel 220 may be locked over information handling system 100 to prevent removal of the system from enclosure 200. Enclosure 200 may hold one or more other information handling systems, each of which may be secured by bezels (e.g., bezel 220-2, 220-3, and 220-4 may represent bezels securing other information handling systems in enclosure 200). In some embodiments, information handling system 100 may be a server, such as a rack or blade server, secured in enclosure located, for example, in a datacenter or server room.

As discussed above with respect to FIG. 1, information handling system 100 may include BMC 170 to manage and/or monitor the operation of information handling system 100. BMC 170 may couple to planar motherboard 202. In addition, information handing system 100 may include trusted platform module (TPM) 204 for securely storing artifacts, such as authentication information.

BMC 170 may be any system, device, or apparatus configured to allow system administrators to manage and/or monitor the operation of information handling system 100. For example, BMC 170 may be a microprocessor, microcontroller, DSP, ASIC, FPGA, EPROM, or any combination thereof. In some embodiments, BMC 170 may be coupled to or embedded in planar motherboard 202. In certain embodiments, BMC 170 may be configured to manage an interface between system management software executing on information handling system 100 and other components of information handling system 100. For example, BMC 170 may communicatively couple to one or more sensors or other elements of information handling system 100 such that BMC 170 may manage and/or monitor the operation of information handling system 100.

In some embodiments, BMC 170 may enable remote monitoring and management of information handling system 100. For example, BMC 170 may implement an Intelligent Platform Management Interface (IPMI) or another suitable management protocol, enabling system administrator 208 to remotely configure, monitor, and/or recover information handling system 100 from a location remote from the information handling system. Thus, BMC 170 may allow system administrator 208 to monitor and/or manage information handling system 100 without having to travel to the location of the system. In certain embodiments, BMC 170 may be an instance of a Dell Remote Access Controller (DRAC) or an Integrated Dell Remote Access Controller (iDRAC).

To ensure access even when information handling system 100 is unavailable or compromised, BMC 170 may allow for out-of-band control of information handling system 100. For example, BMC 170 may have its own processor, memory, network connection, power, and/or access to the system bus (e.g., system bus 121 from FIG. 1). To enable out-of-band control, BMC 170 may include and/or interact with a network interface separate from network interface 160, thereby allowing communications to and from BMC 170 via a management channel physically isolated from an "in band" communication channel associated with network interface 160. Thus, if a failure occurs in information handling system 100 that prevents system administrator 208 from interfacing with information handling system 100 via network interface 160 and/or user I/O subsystem 140 (e.g., operating system failure, power failure, etc.), system administrator 208 may still be able to manage and/or monitor information handling system 100 via BMC 170 to, for example, diagnose and/or repair problems that may have caused the failure. In the same or alternative embodiments, BMC 170 may allow a system administrator to remotely manage one or parameters associated with operation of information handling system 100 and its various resources (e.g., power usage, processor allocation, memory allocation, security privileges, etc.).

In some embodiments, BMC 170 may communicatively couple to bezel 220. Bezel 220 may comprise, among other elements, bezel controller 222, locking mechanism 224, and user interface 226. As mentioned above, information handling system 100 may be a rack or blade server installed in enclosure 200 with one or more other information handling systems. Bezel 220 may secure information handling system 100 in enclosure 200 such that access and/or removal of the system from enclosure 200 requires unlocking bezel 220.

Locking mechanism 224 may lock and unlock bezel 220 from enclosure 200 in which information handling system 100 is located. Locking mechanism 224 may include any mechanism or device capable of securing bezel 220 to enclosure 200, including but not limited to a latch, fastener, bolt, switch, solenoid, slider, magnet, and/or hook. In some embodiments, locking mechanism 224 may include and/or couple to a power source (e.g., battery, power supply, hydraulics, etc.) to automatically lock and unlock bezel 220 from enclosure 200. When locking mechanism 224 is locked, bezel 220 may be secured to enclosure 200, such that information handling system 100 cannot be accessed or removed. By contrast, when locking mechanism 224 is unlocked, bezel 220 may be removed, such that information handling system 100 may then be accessed and/or removed. In some embodiments, locking mechanism 224 may remain locked once bezel 220 is installed in place, securing information handling system 100 within enclosure 200 even if, for example, power is lost.

Bezel controller 222 may provide communication and processing functionality to bezel 220 to manage access requests to and from bezel 220. Bezel controller 222 may comprise a microprocessor, microcontroller, DSP, ASIC, FPGA, EPROM, or any combination thereof. In some embodiments, bezel controller 220 may also include a system, device, or apparatus operable to retain and/or retrieve information, such as program instructions and/or data (e.g., public key used for encrypted communications with another device, such as BMC 170). Bezel controller 222 may communicate with information handling system 100 using any suitable communication protocol over any suitable communication means. For example, in some embodiments, bezel controller 222 may communicate with BMC 170 using bus protocols via one or more buses, including those described above with respect to FIG. 1. In certain embodiments, bezel controller 222 may include software and/or hardware capable of encryption/decryption and random number generation. In some embodiments, bezel controller 222 may communicatively couple to locking mechanism 224 (e.g., via one or more buses, including those described above with respect to FIG. 1), such that information may be communicated to and/or from bezel controller 222 and locking mechanism 224. For example, bezel controller 222 may issue commands to locking mechanism 224 to lock or unlock so that bezel 220 may be removed and access to information handling system 100 may be achieved. As another example, locking mechanism may communicate its status (e.g., locked or unlocked) to bezel controller 222.

In some embodiments, bezel 200 may also include user interface 226. User interface 226 may comprise a system, device, or apparatus generally operable to receive data from and/or transmit data to bezel 220. For example, user interface 226 may represent a variety of communication interfaces, graphics interfaces, video interfaces, user input interfaces, and/or peripheral interfaces. In some embodiments, user interface 226 may comprise a touch panel to display data to and receive data from a user. The touch panel (not shown) may include circuitry for enabling touch functionality in conjunction with a display (not shown). By way of example and not by limitation, user interface 226 may display information (e.g., information regarding bezel 220, information handling system 100, and/or other information) and/or provide a method by which a user may select, request, receive, and/or transmit information (e.g., user authentication statistics, a request to unlock bezel 220, a password, etc.).

A user desiring to remove information handling system 100 from enclosure 200 may submit a remote or local request for bezel 220 to unlock. To illustrate, system administrator 208 may desire physical access to information handling system for repair, maintenance, replacement, or another reason. In some embodiments, system administrator 208 may submit a local request via user interface 226 (e.g., a touch panel or other input method) of bezel 220. In certain embodiments, system administrator 208 may submit a remote request (e.g., from a location outside of the data center) to BMC 170, through for example, out-of-band and/or in-band communications. Local and remote requests may be communicated to BMC 170 for authentication and processing.

To ensure access to information handling system 100 is limited to authorized requests, BMC 170 may authenticate a request to unlock bezel 220 before locking mechanism 224 is unlocked. For example, BMC 170 may authenticate the user issuing the request and/or the hardware from which the request is issued and/or sent. In some embodiments, BMC 170 may interface with trusted platform module (TPM) 204 to authenticate requests to unlock bezel 220. BMC 170 and TPM 204 may communicate in any suitable manner, including for example, over a bus, such as bus 121 discussed in FIG. 1.

In operation, TPM 204 may include memory for securely storing one or more artifacts (e.g., passwords, encryption keys, certificates) used to authenticate access to information handling system 100. TPM 204 may include processing capability (e.g., a microprocessor, microcontroller, DSP, ASIC, FPGA, or any combination thereof) for encrypting and decrypting data. TPM 204 may store artifacts in its secure memory by "sealing" the artifacts, using for example, encryption and platform configuration measurements (e.g., cryptographic hash using a Secure Hashing Algorithm (SHA) or another suitable algorithm) of the element requesting secure storage in TPM 204. The measurements may be stored in a platform configuration register (PCR) of TPM 204. To access artifacts sealed in TPM 204, a requestor may be required to present the measurements stored in the PCR and/or the encryption key associated with TPM 204. Other capabilities of TPM 204 may include remote attestation, binding, and hardware authentication. TPM 204 may use cryptographic keys for signing (e.g., verification or encryption/decryption). In some embodiments, TPM 204 may operate in accordance with a specification described by the Trusted Computing Group (TCG), such as ISO/IEC 11889. TPM 204 may be coupled to planar motherboard 202 or otherwise communicatively coupled (e.g., plug-in module) to BMC 170 such that communication with BMC 170 is possible. As discussed in more detail below with respect to FIGS. 3 and 4, TPM 204 may provide an additional level of security to ensure that requests to unlock bezel 220 are authorized.

Figure 3:
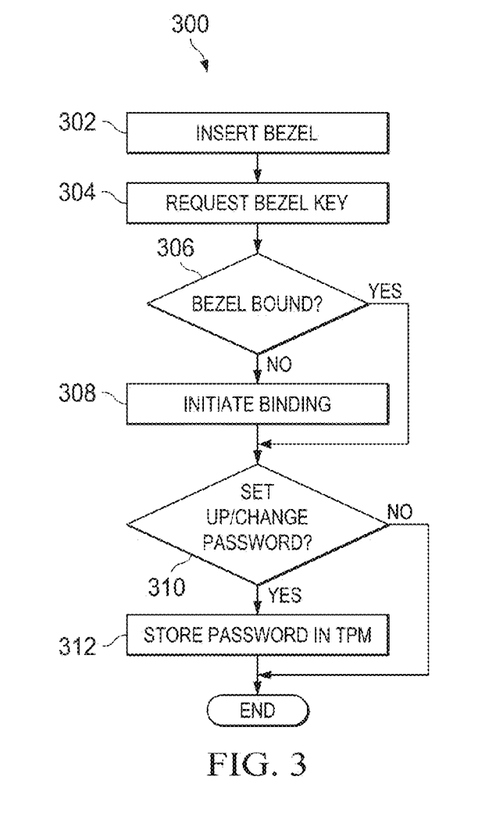
FIG. 3 illustrates a flowchart for configuring a bezel to secure an information handling system in accordance with some embodiments of the present disclosure.

FIG. 3 illustrates an example method 300 for configuring a bezel to secure an information handling system, in accordance with some embodiments of the present disclosure. Method 300 may begin at step 302, where a system administrator inserts a bezel in place to secure an information handling system in an enclosure.

In step 304, the BMC of the information handling system may obtain a public key of the bezel after detecting the bezel insertion. As described above with respect to FIG. 2, the bezel controller may communicate with the BMC using any suitable means. In some embodiments, the public key of the bezel may represent a cryptography key used for secure communication with the bezel. The bezel controller may generate the public key upon receiving a request from the BMC or use a public key previously stored in the bezel controller.

In step 306, the BMC may check if the bezel has been bound to the information handling system. The BMC may use the public key from the bezel controller to verify that the bezel has been bound to the information handling system. For example, if the public key received from the bezel controller lacks certain information, such as a binding identification, then the bezel may be considered unbound. In certain embodiments, the BMC may compare the public key from the bezel to keys in the BMC representing bezel(s) bound to the information handling system. If the public key from the bezel is not associated with a bezel bound to the information handling system, then the bezel may be considered unbound. In some embodiments, the BMC may send a command to the bezel, requesting that the bezel controller confirm whether the bezel has been bound. The command may be encrypted with the private key of the BMC, representing a digital signature of the BMC. The bezel controller may attempt to decrypt the command from the BMC to compare the key from the BMC and keys stored in the bezel controller in order to determine whether the bezel has been bound to the information handling system, returning the result of the determination to the BMC. If the bezel has been bound to the information handling system, then method 300 may proceed to step 310.

If, however, the bezel has not been bound to the information handling system, then method 300 may proceed to step 308. At step 308, the BMC may initiate binding of the bezel to the information handling system. To do so, the BMC may generate an encryption key pair, such as an RSA2048 key pair. The BMC may send the public key to the bezel controller and the private key to the TPM for secure storage. The TPM may seal the private key in its memory, limiting access to the private key to the BMC storing the private key by, for example, storing platform configuration measurements unique to the BMC in a PCR. To access the private key in the TPM, the requestor may be required to have the same platform configuration measurements as those stored in the PCR (e.g., the TPM may require that the requesting BMC be the same BMC that stored the private key in the TPM). Thus, a compromised BMC with different platform configuration measurements or an unauthorized network element seeking the private key from the TPM may not be permitted to access to the private key from the TPM. After storing the private key in the TPM, the BMC may delete the private key to reduce risk that the private key may be accessed and/or copied by unauthorized users. The bezel controller may store the public key from the BMC in the bezel to authenticate unlock requests.

In step 310, the system administrator may determine whether to change or set up password protection to lock and unlock the bezel. In some embodiments, the system administrator may select to set up or change the password locally (e.g., through user interface 226 discussed in FIG. 2) or remotely (e.g., interfacing with the BMC as discussed in FIG. 2). If the user does not desire to change the password required to lock and unlock the bezel, then method 300 ends.

If, however, the system administrator does desire to change or set the password, then method 300 may proceed to step 312. In step 312, the BMC may store the password securely stored in the TPM. For example, the password set by system administrator may be sent to the BMC. The BMC in turn may send the password to the TPM for secure storage. The TPM may seal the password in its memory, protecting access to the password to the BMC storing the password, using for example, platform configuration measurements of the BMC stored in the PCR of the TPM, as discussed above in step 308. At the end of step 312, the bezel is bound to the information handling system and method 300 may end.

Method 300 may be implemented in any suitable manner. It is noted that certain steps or operations described in method 300 may be optional or may be rearranged in different embodiments.

Figure 4:
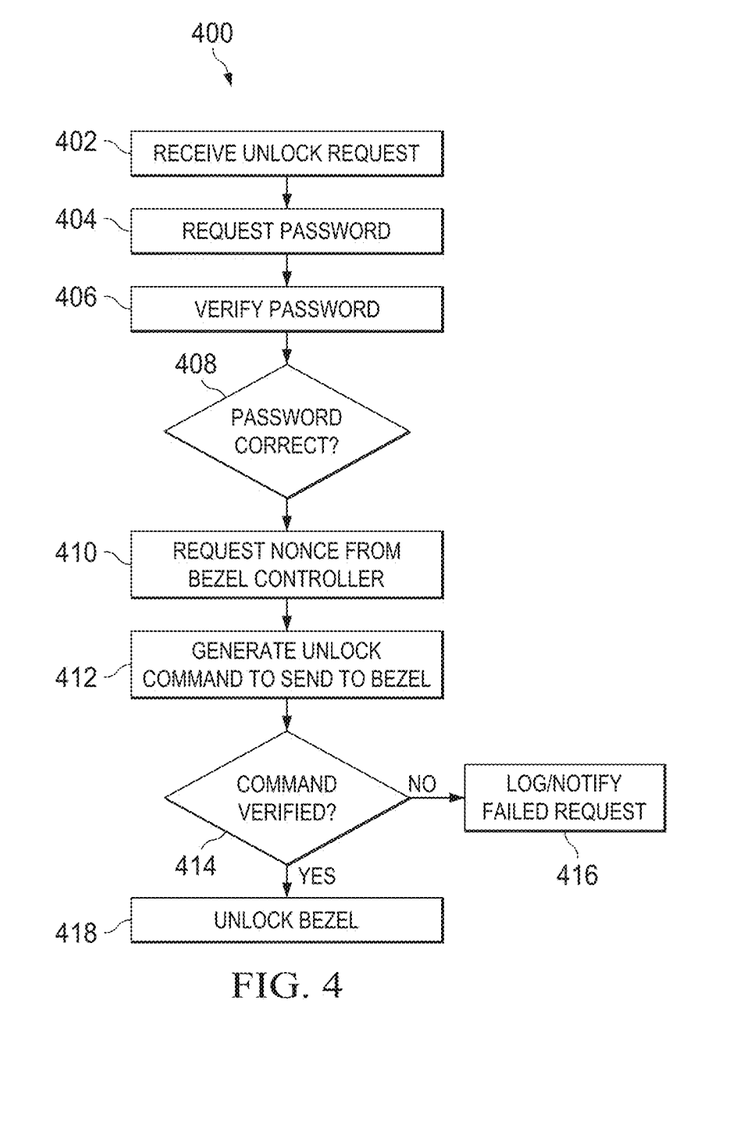
FIG. 4 illustrates a flowchart for unlocking the bezel of an information handling system in accordance with some embodiments of the present disclosure.

FIG. 4 illustrates an example method 400 for unlocking the bezel of an information handling system, in accordance with some embodiments of the present disclosure. Method 400 may begin at step 402, where a BMC receives a request to unlock the bezel of an information handling system. As described above with respect to FIG. 2, the request to unlock the bezel may be a local request made from the bezel of the information handling system or a remote request made by in-band or out-of-band communications through the BMC of the information handling system.

In step 404, the BMC may request that the requestor provide a password to authenticate the unlock request. After receiving the password, method 400 may proceed to step 406 in which the BMC verifies the password. In certain embodiments, the BMC may request the previously stored password (e.g., the password set in steps 310 and 312 of method 300 above) from the TPM. Before releasing the password, the TPM may compare the platform configuration measurements of the BMC stored in the PCR of the TPM to ensure that the BMC is the same BMC that stored the password with the TPM. If the contents of PCR register do not match, then the TPM may not release the password. In some embodiments, the TPM or the BMC may log and/or send a notice of the failed attempt to access the password from the TPM. If the contents of PCR register do match, then the TPM may release the password to the BMC.

In step 408, the BMC may check that the password received from the requestor is correct. For example, the BMC may compare the password from the TPM (e.g., the password that the system administrator set up during binding of the bezel to the information handling system) against the password provided by the requesting user. If the password does not match, then method 400 may proceed back to step 404 to request that the user enter the password again. In some embodiments, the BMC may require that a user wait for a predetermined amount of time before attempting to unlock the bezel again after a failed attempt. In certain embodiments, the BMC may block further attempts to the unlock the bezel after a predetermined number of failed password attempts. In addition, the BMC may log an attempted access and/or notify system administrator of a failed attempt.

If, however, the password provided by the requesting user is correct, then method 400 may proceed to step 410. In step 410, the BMC may request a nonce from the bezel controller. In some embodiments, a nonce value may be a random number generated at the bezel controller. The nonce may be generated by hardware or software on the bezel controller. As discussed in more detail below, the nonce may be used to prevent a replay attack.

In step 412, the BMC may generate an unlock command to send to the bezel controller. In some embodiments, the BMC may use the private key from the TPM to encrypt or digitally sign the unlock command. The BMC may obtain the private key from the TPM in a similar method as described in step 404 above. In certain embodiments, the unlock command may also include the nonce received from the bezel controller in step 410.

In step 414, the bezel controller may verify the unlock command received from the BMC. The bezel controller may use the public key received from the BMC and stored during the binding stage (e.g., method 300 described above in FIG. 3) to decrypt the command from the BMC. To verify the command, the bezel controller may then compare the nonce in the command from the BMC against the nonce generated in step 410. If the nonce in the command from the BMC does not match the nonce stored in the bezel controller, then method 400 may proceed to step 416.

In step 416, the bezel controller may log the failed command from the BMC and/or notify the system administrator of the failed command. In such a scenario, the information handling system may be compromised. For example, a sniffer in the network may have obtained a previous communication between the system administrator, bezel controller, and/or BMC. The sniffer may be attempting a replay attack, resending the previous communication (e.g., an unlock request from the BMC and/or bezel controller) in an attempt to unlock the bezel. In such a scenario, the nonce values not matching may indicate a replay attack. To prevent unauthorized access to the information handling system, the bezel may remain locked to securely hold information handling system in its enclosure.

If, however, the nonce from the BMC does match the nonce stored in the bezel controller, then method 400 may proceed to step 418. In step 418, the bezel controller may initiate an unlock of the bezel. In some embodiments, the bezel controller may send a signal to the locking mechanism of the bezel to unlock. In response, the locking mechanism may unlock (e.g., by sliding a latch, unhooking a hook, releasing a magnetic lock, etc.), permitting removal of the bezel from the enclosure and access and/or removal of the information handling system. In some embodiments, the BMC and/or bezel controller may log and/or notify a system administrator that the bezel has been unlocked.

Herein, "or" is inclusive and not exclusive, unless expressly indicated otherwise or indicated otherwise by context. Therefore, herein, "A or B" means "A, B, or both," unless expressly indicated otherwise or indicated otherwise by context. Moreover, "and" is both joint and several, unless expressly indicated otherwise or indicated otherwise by context. Therefore, herein, "A and B" means "A and B, jointly or severally," unless expressly indicated otherwise or indicated otherwise by context.

The scope of this disclosure encompasses all changes, substitutions, variations, alterations, and modifications to the example embodiments described or illustrated herein that a person having ordinary skill in the art would comprehend. The scope of this disclosure is not limited to the example embodiments described or illustrated herein. Moreover, although this disclosure describes and illustrates respective embodiments herein as including particular components, elements, features, functions, operations, or steps, any of these embodiments may include any combination or permutation of any of the components, elements, features, functions, operations, or steps described or illustrated anywhere herein that a person having ordinary skill in the art would comprehend. Furthermore, reference in the appended claims to an apparatus or system or a component of an apparatus or system being adapted to, arranged to, capable of, configured to, enabled to, operable to, or operative to perform a particular function encompasses that apparatus, system, component, whether or not it or that particular function is activated, turned on, or unlocked, as long as that apparatus, system, or component is so adapted, arranged, capable, configured, enabled, operable, or operative.

What is claimed is:

1. An information handling system, comprising:
   a bezel comprising a locking mechanism securing the information handling system in an enclosure;
   a baseboard management controller (BMC) communicatively coupled to the bezel, the BMC configured to:
   receive a request to unlock the locking mechanism;
   attempt to retrieve a first artifact stored in a trusted platform module (TPM) in response to the request using platform configuration measurements unique to the BMC required to match with platform configuration measurements stored in the TPM, wherein the first artifact comprises first authentication information; and
   when the first artifact is retrieved:
   attempt to authorize the request using the first artifact;
   generate an unlock command comprising a digital signature generated with a second artifact from the TPM, wherein the second artifact comprises second authentication information; and
   communicate the unlock command to a bezel controller, the bezel controller configured to:
   verify the digital signature with a public key corresponding with the second artifact
   unlock the locking mechanism if the request is authorized and the digital signature is verified.

2. The system of claim 1, wherein the request includes a password required to unlock the locking mechanism.

3. The system of claim 2, wherein attempting to authorize the request comprises comparing the password to the first artifact.

4. The system of claim 1, wherein the bezel controller verifies the unlock command by comparing a nonce in the unlock command to a nonce stored in the bezel controller to protect against a replay attack, the nonce stored in the bezel controller generated by the bezel controller and communicated to the BMC prior to the BMC sending the unlock command.

5. The system of claim 1, wherein the bezel further comprises a user interface for displaying and receiving data.

6. The system of claim 5, wherein the request was received through the user interface.

7. The system of claim 1, wherein the request is initiated from a location remote from the information handling system through an out-of-band communication channel.

8. A method of securing an information handling system comprising:
   securing the information handling system in an enclosure with a locking mechanism of a bezel;
   receiving a request to unlock the bezel at a baseboard management controller (BMC), the BMC communicatively coupled to the bezel;
   attempting to retrieve a first artifact stored in a trusted platform module (TPM) in response to the request using platform configuration measurements unique to the BMC required to match with platform configuration measurements stored in the TPM, wherein the first artifact comprises first authentication information; and
   when the first artifact is retrieved:
   attempting to authorize the request using the first artifact;
   generating an unlock command comprising a digital signature generated with a second artifact from the TPM, wherein the second artifact comprises second authentication information;
   communicating the unlock command to a bezel controller;
   verifying, by the bezel controller, the digital signature with a public key corresponding with the second artifact; and
   unlocking, by the bezel controller, the locking mechanism if the request is authorized and the digital signature is verified.

9. The method of claim 8, wherein the request includes a password required to unlock the locking mechanism.

10. The method of claim 9, wherein attempting to authorize the request comprises comparing the password to the first artifact.

11. The method of claim 8, wherein the bezel controller verifies the unlock command by comparing a nonce in the unlock command to a nonce stored in the bezel controller to protect against a replay attack, the nonce stored in the bezel controller generated by the bezel controller and communicated to the BMC prior to the BMC sending the unlock command.

12. The method of claim 8, wherein the bezel further comprises a user interface for displaying and receiving data.

13. The method of claim 12, wherein the request was received through the user interface.

14. The method of claim 8, wherein the request is initiated from a location remote from the information handling system through an out-of-band communication channel.

* * * * *